United States Patent
Musuluri (10) Patent No.: US 10,255,379 B2
(45) Date of Patent: Apr. 9, 2019

(54) SYSTEM AND METHOD FOR DISPLAYING TIMELINE SEARCH RESULTS

(71) Applicant: Aravind Musuluri, Johns Creek, GA (US)

(72) Inventor: Aravind Musuluri, Johns Creek, GA (US)

( * ) Notice: Subject to any disclaimer, the term of this patent is extended or adjusted under 35 U.S.C. 154(b) by 365 days.

(21) Appl. No.: 14/697,449

(22) Filed: Apr. 27, 2015

(65) Prior Publication Data

US 2015/0310130 A1 Oct. 29, 2015

Related U.S. Application Data

(60) Provisional application No. 61/984,208, filed on Apr. 25, 2014.

(51) Int. Cl.
*G06F 17/30* (2006.01)

(52) U.S. Cl.
CPC .. *G06F 17/30991* (2013.01); *G06F 17/30864* (2013.01)

(58) Field of Classification Search
CPC ......... G06F 17/30991; G06F 17/30864; G06F 17/30064; G06F 17/30551
USPC ......................................................... 707/725
See application file for complete search history.

(56) References Cited

U.S. PATENT DOCUMENTS

| | | | | |
|---|---|---|---|---|
| 8,091,033 B2 * | 1/2012 | von Sichart | ...... | G06F 17/30554 715/751 |
| 8,356,248 B1 * | 1/2013 | Killalea | ............. | G06Q 30/0601 707/751 |
| 2008/0082578 A1 * | 4/2008 | Hogue | ............... | G06F 17/30864 |
| 2008/0294663 A1 * | 11/2008 | Heinley | ................. | G06F 3/0481 |
| 2008/0301120 A1 | 12/2008 | Zhu et al. | | |
| 2009/0254825 A1 * | 10/2009 | Sichart | ................. | G06Q 10/109 715/716 |
| 2013/0080291 A1 * | 3/2013 | Musuluri | ............. | G06Q 30/016 705/26.62 |

* cited by examiner

*Primary Examiner* — Sheree N Brown (57) ABSTRACT

Methods and Systems to display the results of a search operation are provided. More particularly the invention relates to a method to display search results comprising a relevant portion of the data in timeline. The method comprising displaying said results; said display comprising a extract preserving the timeline event properties. The extract may further comprise of one or more timeline properties.

3 Claims, 6 Drawing Sheets

SYSTEM AND METHOD FOR DISPLAYING TIMELINE SEARCH RESULTS

CROSS REFERENCE TO RELATED APPLICATION

This application claims priority to U.S. Provisional Application Ser. No. 61/984,208 entitled "System And Method For Displaying Timeline Search Results" filed on Apr. 25, 2014, which is incorporated herein by reference.

TECHNICAL FIELD

The present disclosure generally relates to search engine operations and method to display the results of a search operation. Particularly, the disclosure relates to improving user experience in viewing the search results and more particularly to a system and method for displaying timeline search results.

BACKGROUND

The statements in this section merely provide background information related to the present disclosure and may not constitute prior art.

It is commonly required in the field of Information Technology to provide a service that searches through data sources. The data source herein may refer to data and/or document(s) on the Internet, intranet, storage devices, and so on. In order to use a search engine, a user seeking information on a desired topic generally inputs a search query consisting of keyword(s) or phrase(s) relevant to the topic into the search interface of the search engine. In response, the search engine typically displays a report with a prioritized list of links pointing to relevant documents containing the search keywords. Oftentimes, a short summary of text i.e., extract/snippet is also included for each result. The extract/snippet is that portion or portions of the text in the document that contain the keywords from the search query.

While the popularity of search engines may rely on various factors; relevancy of the search results and the manner in which they are displayed play an important role in enhancing a user experience. Known search engines like Google®, Bing®, Yahoo® etc. typically display a search result page comprising multiple search results and for each search result an extract in a textual format. This is a disadvantage since some important visual cues in the document may be lost, thereby making the results less useful to a user. One example of such disadvantage is when the documents contain timeline data. When a user enters the search query for which a relevant result comprises a timeline, the search engines only display a relevant portion of the timeline based on keywords and few fragments around the keywords in a text format that makes it less useful for the reader.

Yet another drawback of existing search engines is that they fail to present results in a way that is easy for the user to understand the nature and type of results.

Systems for searching the Intranets, Extranets, Local Area Networks, individual computers and even single documents also generally suffer from these same drawbacks.

In view of the above drawbacks, there remains a need for an effective method of searching data sources for useful information relating to topics of user's interest.

SUMMARY

The following presents a simplified summary of the disclosure in order to provide a basic understanding to the reader. This summary is not an extensive overview of the disclosure and it does not identify key/critical elements of the disclosure or delineate the scope of the disclosure. Its sole purpose is to present some concepts disclosed herein in a simplified form as a prelude to the more detailed description that is presented later.

Exemplary embodiments of the present disclosure are directed towards a method and system for displaying the search results of a search operation comprising one or more timelines.

According to aspects illustrated herein, the present invention relates to a method to display the results of a search operation on at least one data source, wherein at least one result comprises a relevant portion of the data in a timeline format in the original document; the said result comprising an extract and at least one timeline property.

In a preferred embodiment of the current aspect, the extract comprises at least one timeline item wherein the timeline item comprises a first component selected from the timeline date/time qualifier and a second component selected from a portion of the timeline event.

The timeline item may be selected from the group comprising relevant item, the first item, the last item and combinations thereof.

In a preferred embodiment, the timeline item is selected from the relevant item. In another preferred embodiment, the timeline items selected are a combination of the first item, relevant item and a last item.

The timeline property may be selected from the group comprising data range, timespan, number of events, calculated property and combinations thereof.

In another aspect of the present invention, the invention relates to a method to display the results of a search operation on at least one data source, wherein at least one result comprises a relevant portion of the data in a timeline format in the original document; the said result comprising a extract; the said extract comprising a first component selected from date/time qualifier of a timeline item and the second component comprising a portion of the timeline event.

The timeline item may be selected from the group comprising relevant item, the first item, the last item and combinations thereof.

In a preferred embodiment, the timeline item is selected from the relevant item. In another preferred embodiment, the timeline items selected are a combination of the first item, relevant item and a last item.

Optionally, the search result in accordance with the present invention may include a title and a link to the original document.

In another aspect of the present disclosure is provided with a system comprising search engine unit. The search engine unit may comprise one or more logics configured to perform the functions and operations associated with the above-disclosed methods.

In another aspect of the present disclosure is provided a computer program product executable in a memory of a search engine unit

BRIEF DESCRIPTION OF THE DRAWINGS

The drawings described herein are for illustration purposes only and are not intended to limit the scope of the present disclosure in anyway. Throughout the disclosure, like elements are represented by like reference numerals, which are given by way of illustration only and thus are not limitative of the various embodiments.

Other objects and advantages of the present disclosure will become apparent to those skilled in the art upon reading the following detailed description of the preferred embodiments, in conjunction with the accompanying drawings, wherein.

DETAILED DESCRIPTION

It is to be understood that the present disclosure is not limited in its application to the details of construction and the arrangement of components set forth in the following description or illustrated in the drawings. The present disclosure is capable of other embodiments and of being practiced or of being carried out in various ways. Also, it is to be understood that the phraseology and terminology used herein is for the purpose of description and should not be regarded as limiting.

The use of "including", "comprising" or "having" and variations thereof herein is meant to encompass the items listed thereafter and equivalents thereof as well as additional items. The terms "a" and "an" herein do not denote a limitation of quantity, but rather denote the presence of at least one of the referenced item. Further, the use of terms "first", "second", and "third", and the like, herein do not denote any order, quantity, or importance, but rather are used to distinguish one element from another.

The disclosure described here is equally applicable to searching and returning links to any document containing text and optional presentation semantics (the look and feel instructions) such as, but not limited to, HTML, DHTML, XML, SGML, PDF, E-mail, Microsoft® Word documents, Microsoft® Power point documents, news group postings, multimedia objects, Graphics Interchange Format images and/or Shockwave Flash files.

Through the length of the specification and claims, the words "extract" and "snippet" are used interchangeably.

A timeline in accordance with the present disclosure includes all data representing a sequence of items arranged in a chronological or reverse chronological order; each item comprising at least one date/time qualifier and an event. A timeline property in accordance with the present invention includes data related to a particular timeline including but not limited to data range, timespan, number of events, calculated value and combinations thereof.

Date/time qualifier in accordance with the present disclosure relates to an date/time when the event occurred.

Event in accordance with the present invention relates to any event or item that qualifies a date/time qualifier.

A relevant item in accordance with the present invention is an item of the timeline that is relevant to the user search as determined by the search engine.

Figure 1:
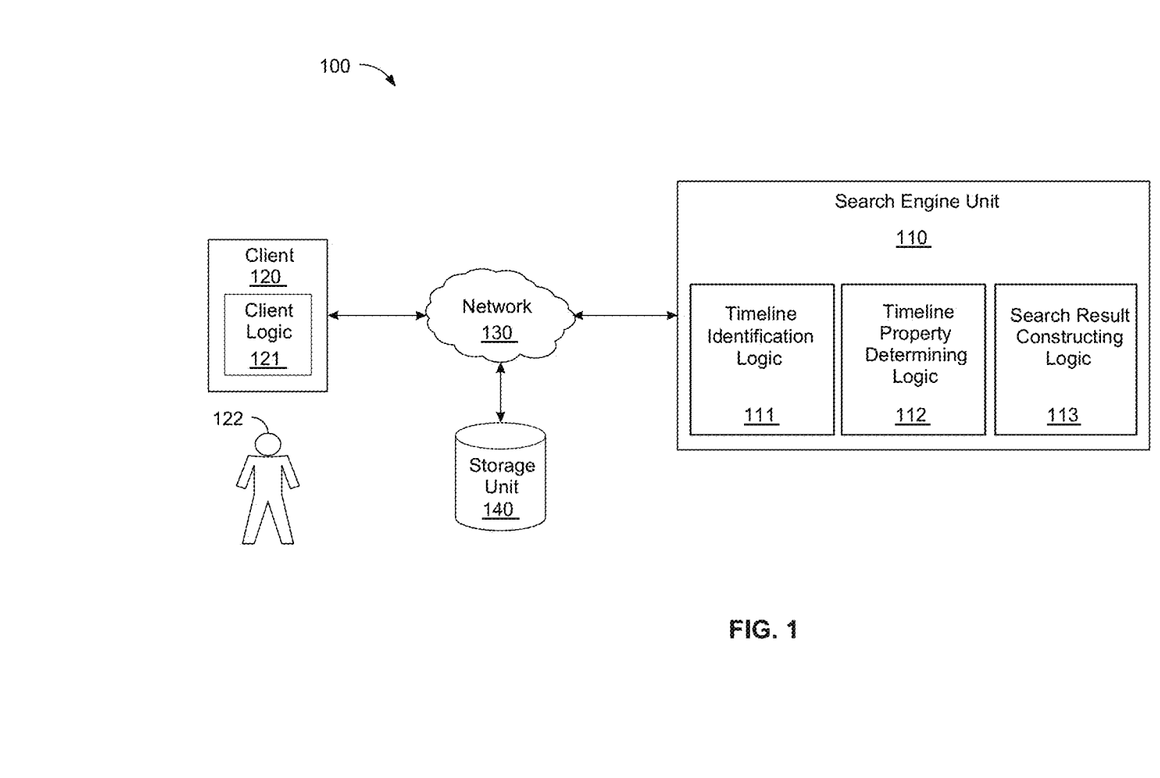
FIG. 1 is a block diagram illustrating an exemplary search environment in accordance with an embodiment of the present disclosure.

FIG. 1 depicts a search environment 100 in accordance with an exemplary embodiment of the present disclosure. It will be understood and appreciated by those of ordinary skill in the art that the computing system architecture 100 shown in FIG. 1 is merely an example of one suitable computing system and is not intended to suggest any limitation as to the scope of use or functionality of the present invention. Neither should the computing system architecture 100 be interpreted as having any dependency or requirement related to any single module/component or combination of modules/components illustrated therein.

The system 100 comprises a search engine unit 110, a client 120 and a storage unit 140. The search engine unit 110, the client 120 and the storage unit 140 all communicate over a network 130.

The network 130 can include any type of network known in the art or future-developed. In this regard, the network 130 may be an Ethernet, a local area network (LAN), or a wide area network (WAN), e.g., the Internet, or a combination of networks.

The search engine unit 110 may be a dedicated or shared server including but not limited to any type of application server, database server, or file server configurable and combinations thereof. The search engine unit 110 and the client 120 may include, but are not limited to, a computer, handheld unit, mobile unit, consumer electronic unit, or the like.

The exemplary search engine unit 110 comprises timeline identification logic 111, timeline property determining logic 112 and search result constructing logic 113.

In the exemplary search engine unit 110, the timeline identification logic 111 may be configured to identify presence or existence of the timeline within the search result. If a timeline is identified, then the timeline identification logic 111 may be further configured to identify the events, date/time qualifiers and the like.

The search engine unit 110 further comprises the timeline property determining logic 112. The timeline property determining logic 112 may be configured to determine the properties of timelines identified by the timeline identification logic 111. The properties identified by the timeline property determining logic 112 may be, for example, data range, timespan, number of events, calculated value and the like.

The search engine unit 110 further comprises the search result constructing logic 113. The search result constructing logic 113 may be configured to construct the search result. The process of constructing the search result may include adding the timeline properties identified by the timeline property determining logic 112 to the search result. For example, the timespan and number of events may be included in the search result to enhance user experience. The search result constructing logic 113 may also be configured to construct the snippet in such a way that the date/time qualifier of the text relevant to the search query is always included. Further, the search result constructing logic 113 may be configured to display the first few events and last few events as part of the search result. The search result constructing logic 113 is further explained with reference to FIG. 5.

The storage unit 140 is configured to store information associated with search results, timelines, or the like. In various embodiments, such information may include, without limitation, domains, URLs, webpages, websites, documents, timelines, timeline properties, indexes, information associated therewith, and the like. In embodiments, the storage unit 140 is configured to be searchable for one or more of the items stored in association therewith. It will be understood and appreciated by those of ordinary skill in the art that the information stored in association with the storage unit 140 may be configurable and may include any information relevant to search results, timelines, or the like. The content and volume of such information are not intended to limit the scope of embodiments of the present disclosure in any way. Further, though illustrated as a single, independent component, the storage unit 140 may, in fact, be a plurality of storage units, for instance a database cluster, portions of which may reside on the search engine unit 110, the client 120, another external computing device (not shown), and/or any combination thereof. Moreover, the storage unit 140 may be included within the search engine unit 110 or client 120 as a computer-storage medium. The single unit depictions are meant for clarity, not to limit the scope of embodiments in any form.

A user 122 through the client logic 121 on the client 120 may enter a search query consisting of keyword(s) which may identify the type of information that the user is interested in retrieving. The client logic 121 may comprise, for example, an Internet browser; however, other types of client logic 121 for interfacing with the user 122 and for communicating with the search engine unit 110 may be used in other embodiments of the present disclosure. The client logic 121 transmits the user search query to the search engine unit 110 via the network 130. Upon receiving the user search query the search engine unit 110 examines the storage unit 140 and compiles a prioritized list of documents containing all or some of the keyword(s) and returns the search results comprising inline visual representation(s) to the client logic 121 which displays the results to the user 122 in a window.

Figure 2:
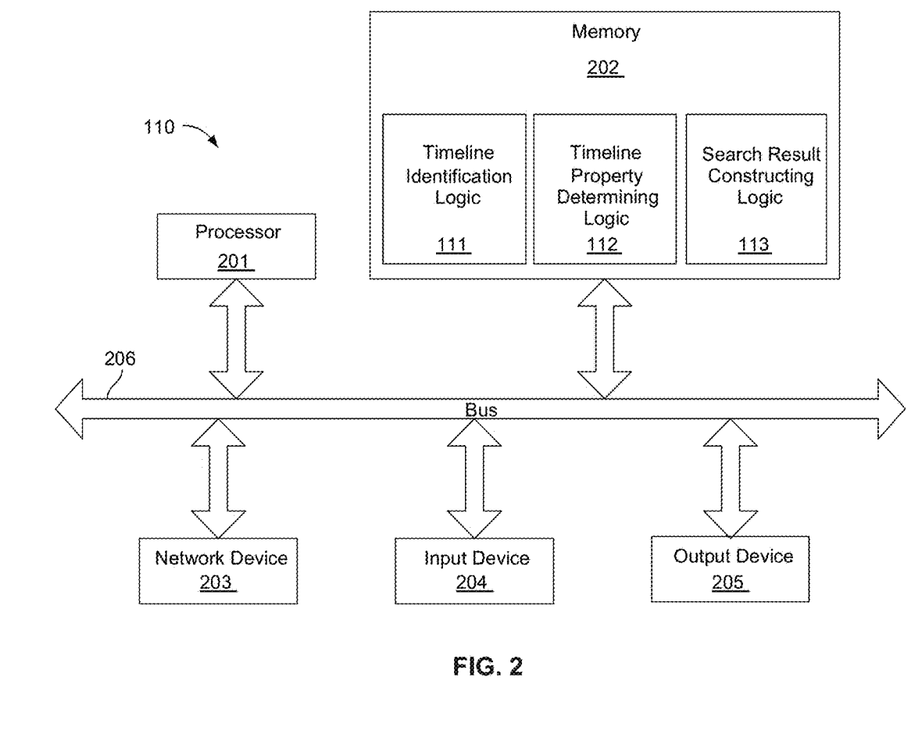
FIG. 2 is a block diagram of an exemplary computing device of FIG. 1.

FIG. 2 illustrates an exemplary computer in accordance with the present invention. It should be noted, however, that embodiments are not limited to implementation on such computing devices, but may be implemented on any of a variety of different types of computing units within the scope of embodiments hereof.

The search engine unit 110 may include a bus 206, a processor 201, memory 202, network device 203, input device 204, and an output device 205. Bus 206 may include a path that permits communication among the components of the search engine unit 110.

The memory 202 stores the timeline identification logic 111, the timeline property determining logic 112, and the timeline constructing logic 113 as software in memory 202.

The memory 202 may be any type of computer memory known in the art or future-developed for electronically storing data and/or logic, including volatile and non-volatile memory. In this regard, memory 202 can include random access memory (RAM), read-only memory (ROM), flash memory, any magnetic computer storage unit, including hard disks, floppy discs, or magnetic tapes, and optical discs.

The processor 201 comprises processing hardware for interpreting or executing tasks or instructions stored in memory 202. Note that the processor 201 may be a microprocessor, a digital processor, or other type of circuitry configured to run and/or execute instructions.

The network device 203 may be any type of network unit (e.g., a modem) known in the art or future-developed for communicating over a network 130 (FIG. 1). In this regard, the search engine unit 110 (FIG. 1) communicates with the storage unit 140 (FIG. 1) and the client 120 (FIG. 1) over the network 130 (FIG. 1) via the network device 203.

The input device 204 is any type of input unit known in the art or future-developed for receiving data. As an example, the input unit 204 may be a keyboard, a mouse, a touch screen, a serial port, a scanner, a camera, or a microphone.

The output device 205 may be any type of output unit known in the art or future-developed for displaying or outputting data. As an example, the output device 205 may be a liquid crystal display (LCD) or other type of video display unit, a speaker, or a printer.

Note that the disclosure may also be practiced in a distributed computing environment where tasks or instructions of search engine unit 110 (FIG. 1) are performed by multiple computing units communicatively coupled to the network.

Further note that, the search engine unit 110 (FIG. 1) components may be implemented by software, hardware, firmware or any combination thereof. In the exemplary search engine unit 110 (FIG. 1), depicted by FIG. 1, all the components are implemented by software and stored in memory 202.

Figure 3:
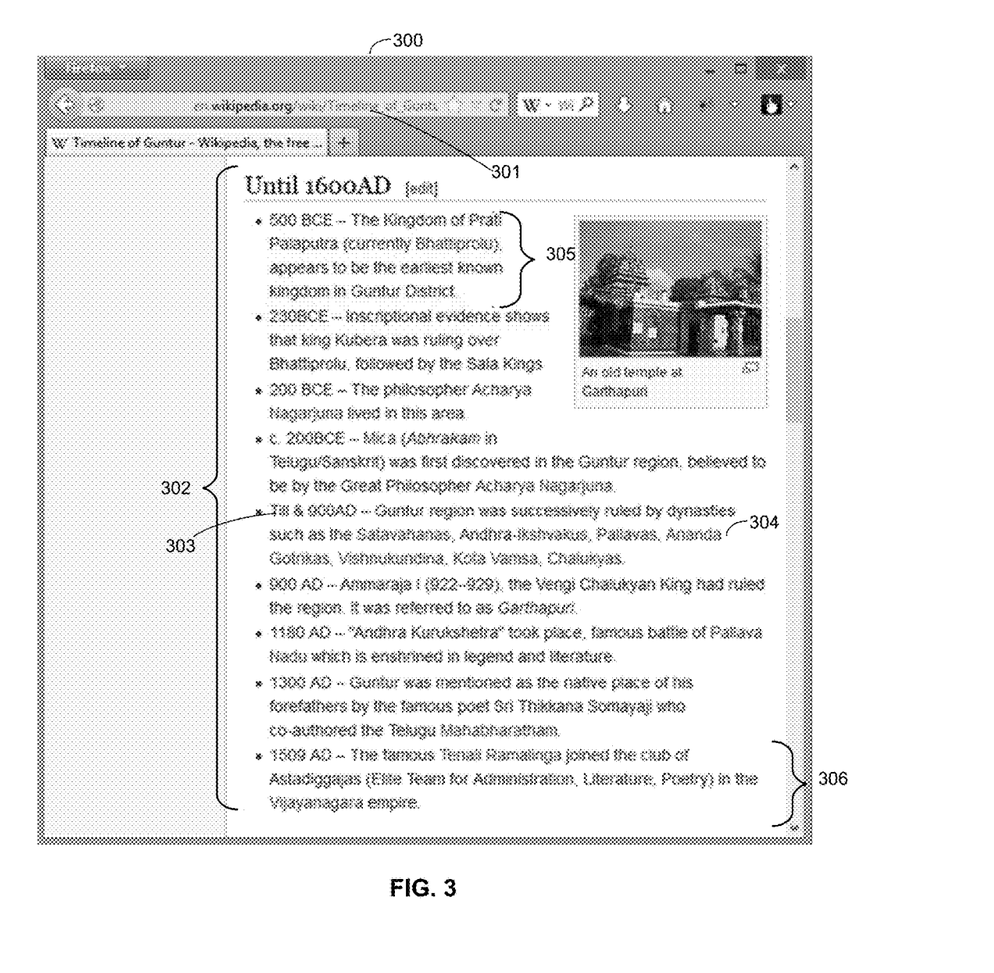
FIG. 3 illustrates an exemplary document comprising data in a timeline format.

FIG. 3 is a diagram illustrating a portion of a document 300 identified by the URL 301 comprising a timeline 302. The timeline 302 represents a sequence of items in chronological order including a first item 305 and a last item 306. Each item in the timeline 302 comprises a date/time qualifier and an event. For an exemplary date/time qualifier "Till & 900 AD" 303, the corresponding event is ["Guntur region . . . Kota Vamsa, Chalukyas."] 304.

Figure 4:
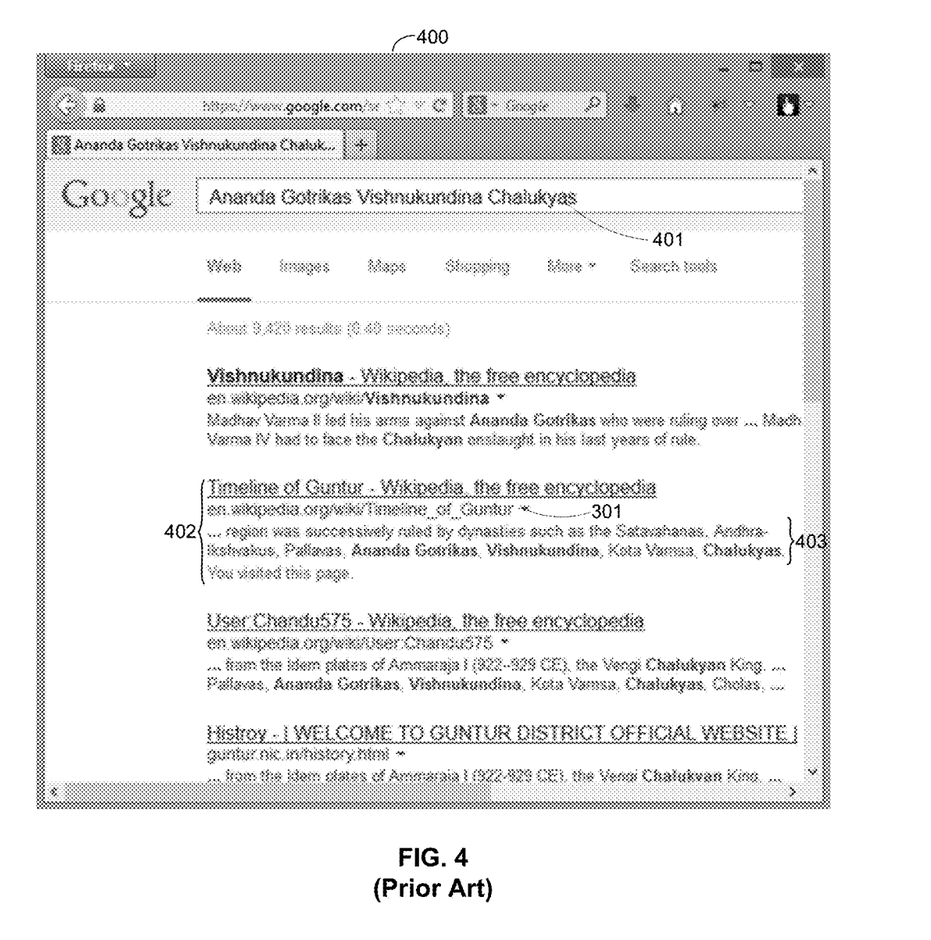
FIG. 4 (Prior Art) and FIG. 5 depict an exemplary search operation with a comparative illustration of known prior art methods and methods in accordance with the present disclosure respectively.

FIG. 4 shows a known prior art method of displaying results of a search operation. When a user enters a search query 401, the search engine performs a search operation and returns the search results to the user in the form of a result page 400. The search result 402 comprises a snippet 403 from the document 300 (FIG. 3) identified by the URL 301. The snippet 403 comprising of text from the timeline 302 (FIG. 3) is formatted in plain text format identified as relevant data by the prior art search engine. While the results identify the keywords, the date/time qualifier is not included as part of the extract 403. Further, no timeline properties are identified and displayed as part of the search result 402.

Figure 5:
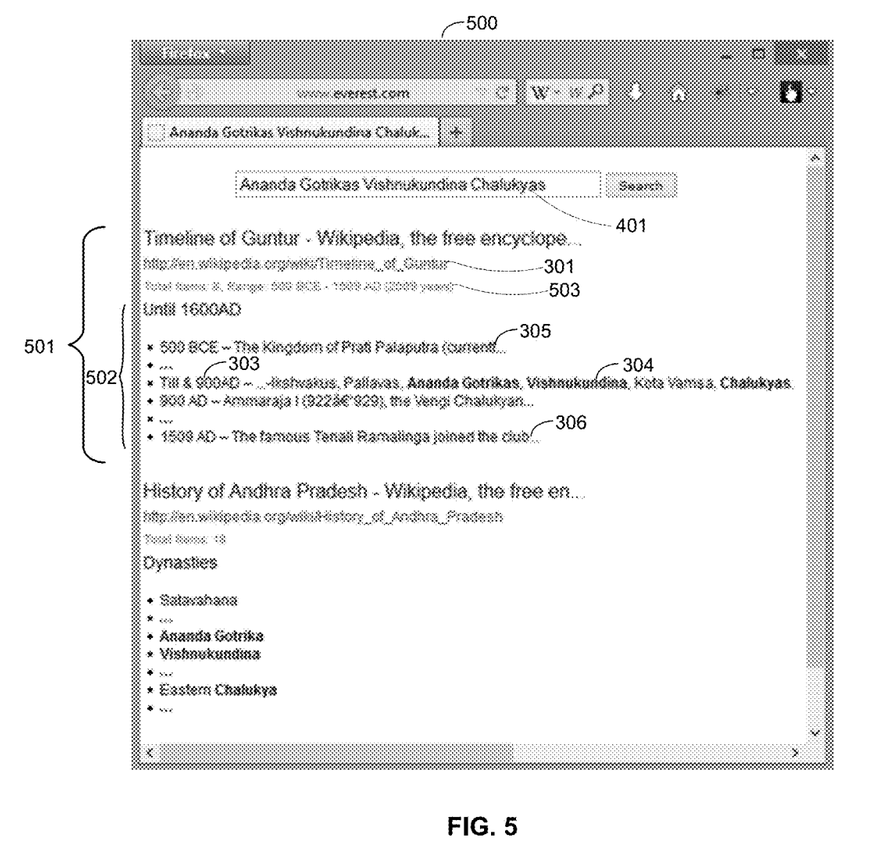

FIG. 5 depicts portion of search results page 500 in accordance with a preferred embodiment of the present disclosure. When the user enters a search query 401, the search engine unit 110 (FIG. 1) may return search results to the user in the form of the search result page 500. The search result 501 comprises a snippet 502 from the document 300 (FIG. 3) identified by the URL 301. The search snippet 502 is constructed from the timeline 302 (FIG. 3) identified by the timeline identification logic 111 (FIG. 1) by the presence and chronological order of the data/time qualifiers in the timeline items. The snippet 502 comprises the first item 305 (See FIG. 3 also); the last item 306 (See FIG. 3 also) and a relevant item (from the document 300) comprising the data/time qualifier 303 and the event 304 to enhance the user experience. Further note that the search result constructing logic 113 (FIG. 1) constructed the search result 501 preserving the data/time qualifier for each of the timeline items in the search result 501.

The search result 501 further comprises timeline properties 503 identified by the timeline property determining logic 112 (FIG. 1). The timeline properties 503 comprise of number of items "8" computed by the timeline property determining logic 112 (FIG. 1) by counting the number of items in the timeline 302 (FIG. 3), data range "500 BCE-1509 AD" computed by the timeline property determining logic 112 (FIG. 1) from the first item and last item of the timeline 302 (FIG. 3), and timespan "2009 years" computed by the timeline property determining logic 112 (FIG. 1) from subtracting the last item data/time qualifier with the first item data/time qualifier of the timeline 302 (FIG. 3).

Figure 6:
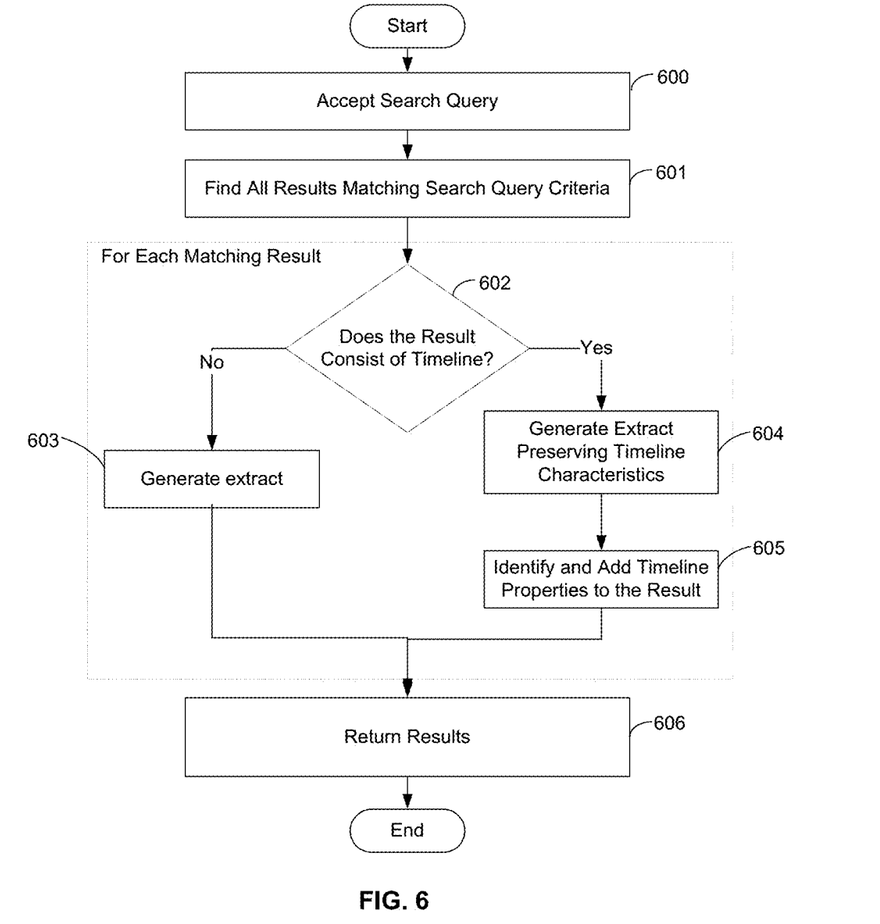
FIG. 6 is a flow diagram of a method of displaying search results comprising timelines, in accordance with one or more embodiments of the present invention.

FIG. 6 is a flow chart illustrating one method in accordance with the present disclosure. In step 600, the search engine unit may accept the search query and find all results matching the search query criteria 601. For each matching search result, the search engine determines if any of the results comprise of a timeline 602. In absence of a timeline, the search engine generates extract in textual format 603 and returns the results to the user 606. If any of the matching search results comprise a timeline, the search engine generates extracts preserving the timeline characteristics 604. Further the search engine may identify and add timeline properties to the extract 605 and return the results to the user 606.

The claimed subject matter has been provided here with reference to one or more features or embodiments. Those skilled in the art will recognize and appreciate that, despite of the detailed nature of the exemplary embodiments provided here, changes and modifications may be applied to said embodiments without limiting or departing from the generally intended scope. These and various other adaptations and combinations of the embodiments provided here are within the scope of the disclosed subject matter as defined by the claims and their full set of equivalents.

What is claimed is:

1. A method executable on a computing device comprising a processor, memory and a storage unit to display results of a search operation on at least one data source(s) comprising documents, said method comprising:
   (a) accepting a search query comprising keyword(s) from a user;
   (b) generating search results by identifying documents comprising the keyword(s) in response to the search query;
   (c) identifying search results comprising the keyword(s) in a timeline in the documents;
   (d) extracting, by the processor, from the timeline a portion of a relevant timeline item; wherein the relevant timeline item contains the keyword(s); and a portion of additional timeline item(s) selected from a first timeline item and/or last timeline item;
   (e) constructing, by the processor, a search result snippet for the timeline comprising the portion of the relevant timeline item; and the portion of additional timeline item(s); and
   (f) returning the search results comprising the search result snippet.

2. The method as in claim 1, wherein the timeline item comprises a first component selected from a date/time qualifier and a second component comprising of an event.

3. A method executable on a computing device comprising a processor, memory and a storage unit to display results of a search operation on at least one data source(s) comprising documents, said method comprising:
   (a) accepting a search query comprising keyword(s) from a user;
   (b) generating search results by identifying documents comprising the keyword(s) in response to the search query;
   (c) identifying search results comprising the keyword(s) in a timeline in the documents;
   (d) determining, by the processor, timeline properties for the timeline, wherein said determination comprises computing a data range, a timespan, and/or a number of events; and
   (e) Returning the search results comprising the timeline properties.

* * * * *